United States Patent
Shirasawa

[11] Patent Number: 5,906,142
[45] Date of Patent: May 25, 1999

[54] WAVE GEAR DRIVE

[75] Inventor: Naomi Shirasawa, Nagano-ken, Japan

[73] Assignee: Harmonic Drive Systems, Inc., Tokyo, Japan

[21] Appl. No.: 08/927,487

[22] Filed: Sep. 11, 1997

[51] Int. Cl.⁶ .................................................. F16H 1/00
[52] U.S. Cl. ............................................................. 74/640
[58] Field of Search ................................................ 74/640

[56] References Cited

U.S. PATENT DOCUMENTS 5,775,178  7/1998  Asawa et al. ............................. 74/640

FOREIGN PATENT DOCUMENTS

PCT/JP97/03572  10/1997  WIPO.
PCT/JP97/03751  10/1997  WIPO.

*Primary Examiner*—Dirk Wright
*Attorney, Agent, or Firm*—Burns, Doane, Swecker & Mathis LLP

[57] ABSTRACT

A wave gear drive (1) has first and second end plates (2) and (3) arranged to rotate relative with each other by means of a cross roller bearing (4) positioned between the plates (2, 3). An inner race (41) of the cross roller bearing (4) is formed integrally on a circumferential Inner surface with an internal gear (11). The inner race (41) is directly fastened to the first end plate (2), while an outer race (44) of the cross roller bearing (4) is fastened to the second end plate in a manner such that a circular boss (17) of a flexible external gear is held between the outer race (44) and the second end plate (3). The internal teeth (11) are positioned approximately at a radially inner side of a raceway (47) of the cross roller bearing (4). Thus, the wave gear drive (1) is small and compact, and the rigidity is increased.

5 Claims, 1 Drawing Sheet

WAVE GEAR DRIVE

BACKGROUND OF THE INVENTION

1. Field of the Invention

The present invention relates to a wave gear drive having a flexible external gear that can be made compact and small and also has a high rigidity.

2. Related Art Description

There has known a wave gear drive that has a flexible external gear. Typically, this flexible external gear comprises a cylindrical body, a circular diaphragm extending outward in a radial direction from one open end of the body, a circular boss formed integrally on a circumferential outer peripheral edge of the diaphragm, and external teeth formed on a circumferential outer surface of the other open end portion of the body.

The invention proposes a wave gear drive that can be made small and compact in structure, especially in length measured along an axial direction thereof. For example, such a wave gear drive is disclosed in Japanese Laid-Open No. Hei 8-312730 assigned to the same assignee of the present invention.

SUMMARY OF THE INVENTION

An object of the present invention is to provide a wave gear drive that can be constituted more small and compact.

Another object of the present invention is to provide a wave gear drive that can contribute to enhance the rigidity thereof.

In order to solve the above and other objects, according to the present invention, there is provided a wave gear drive that comprises first and second end plates positioned in a predetermined gap along an axial direction of the drive; a cross roller bearing positioned between the first and second end plates; a rotational shaft which extends through the first and second end plates and is supported rotatable by these end plates; a circular rigid internal gear formed integrally on an inner race of the cross roller bearing; a flexible external gear positioned inside the rigid internal gear; and a wave generator which is fixedly mounted on the rotational shaft and is positioned inside the flexible external gear, wherein the inner race of the cross roller bearing is fixedly mounted on the first end plate and an outer race of the cross roller bearing is fixedly mounted on the second end plate so as to allow the first and second end plates to rotate relatively.

The rigid internal gear must be fixed to the first end plate, and at the same time it must be fixed to the side of the inner race of the cross roller bearing. According to the present invention, since the rigid internal gear is formed integrally on the inner race of the cross roller bearing, fastening of these three members can easily be carried out and the overall structure of the wave gear drive can be made small and compact.

In addition, integration of the separate component parts of the wave gear drive makes it possible to reduce or avoid assembly error of these parts, as well as to increase the rigidity of the wave gear drive.

These three members may be made integrally, namely as one component part. More specifically, the first end plate may be formed integrally with the inner race of the cross roller bearing and the inner rase may be formed integrally with the rigid internal gear, whereby the overall structure of the wave gear drive can be made smaller and more compact, and the rigidity thereof can also be increased.

It is preferable that the tooth portion of the rigid internal gear is positioned approximately at a radially inner side of a raceway of the cross roller bearing, This can suppress stress deformation of the tooth portion of the rigid internal gear, thereby avoiding adverse affects on the cross rollers caused by stress deformation of the rigid internal gear.

The rotational shaft may be a hollow shaft, wherein the hollow portion of the shaft can be utilized for wiring space and the like. Further, the wave generator may be integrally formed on the rotational shaft.

DETAILED DESCRIPTION OF THE PREFERRED EMBODIMENT

Figure 1:
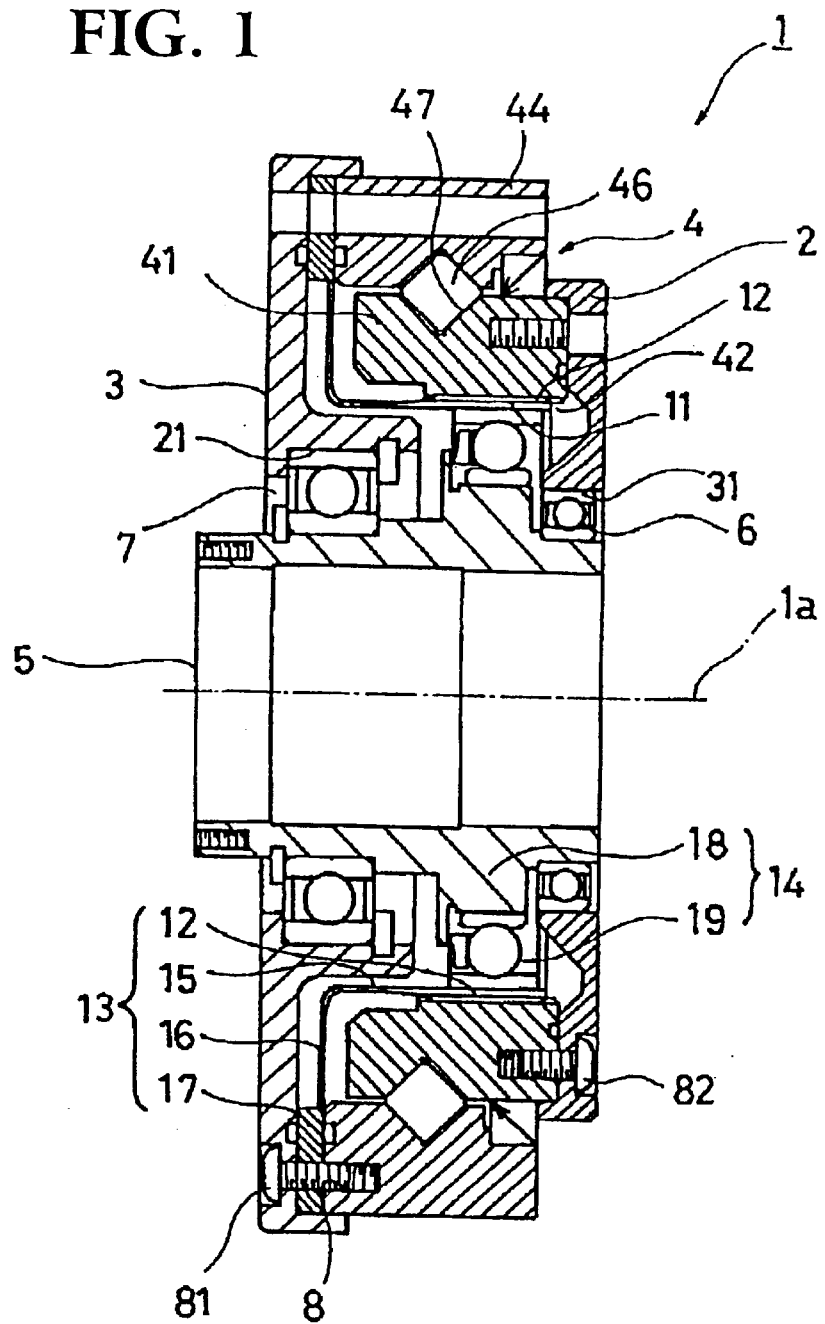
FIG. 1 is a cross sectional view of an example of a wave gear drive according to the present invention.

FIG. 1 shows a cross section of a wave gear drive according to the present invention. The wave gear drive 1 has first and second end plates 2 and 3 positioned in a prescribed gap along an axial direction 1a thereof. A cross roller bearing 4 is positioned at a radially outer side between the first and second end plates 2, 3. An input rotational shaft 4 is arranged passing through the first and second end plates 2, 3 along the axial direction 1a. The input rotational shaft 4 is rotatably supported by these end plates 2, 3 via ball bearings 6 and 7 mounted on circumferential inner surfaces 21 and 31 of the end plates 2, 3, respectively.

The cross roller bearing 4 has an inner race 41 which in integrally formed with a rigid internal gear. More specifically, internal teeth 11 of the rigid internal gear are formed on a circumferential inner surface of the inner race 41. Inside the internal teeth 11, there is provided a flexible external gear 13 having external teeth 12 which are meshable with the internal teeth 11. An elliptical wave generator 14 is inserted into the flexible external gear 13.

The external gear 13 has a cylindrical body 15, a circular diaphragm 16 extending outward in a radial direction from one open end of the body 15, a circular boss 17 formed integrally on a circumferential outer peripheral edge of the diaphragm 16. The external teeth 12 are formed on a circumferential outer surface of the other open end portion of the body 15. The wave generator 14 comprises an elliptical rigid cam plate 18 and a wave bearing 19 fixed on the cam plate 18. In the present example, the rigid cam plate 18 is formed integrally on the input rotational shaft 5.

On the other hand, the cross roller bearing 4 has an outer race 44 which is fixedly connected to the second end plate 3 such that the circular boss 17 of the flexible external gear 13 is held between the outer race 44 and the second end plate 3. These three members in this state are fastened together by a plurality of fastening bolts 81 arranged circumferentially. The inner race 41 of the cross roller bearing 4 is fastened to the first end plate 2 by a plurality of fastening bolts 82 arranged circumferentially.

In the wave gear drive 1 constituted above, the input rotational shaft 5 has an end portion projecting from the second end plate 3 for connecting to a driving source such as a motor shaft and the like (not shown), whereas the first or second end plate 2, 3 is connected to a driven side (not shown). When the input rotational shaft 5 is rotated at high speed, meshing portions of the external teeth 12 with the internal teeth 11 move in a circumferential direction. Since the internal gear differs in tooth number from the external gear, relative rotation is generated due to the difference in tooth number between these gears. The relative rotation is one that is greatly reduced in speed compared to the input rotation. One of the first and second end plates 2, 3 is connected to the driven side and the other is fixed not to rotate, so that an output rotation is transferred to the driven side via the end plate connected to the driven side.

In the wave gear drive 1, the internal teeth 11 are positioned approximately at a radially inner side of the raceway 47 of the cross roller bearing 4 when viewed along a radial direction. Therefore, the cross roller bearing 4 is prevented from being adversely affected by deformation of the inner race 41 due to the stress acting thereon.

In the present example, the rigid internal gear is integrally formed on the inner race of the cross roller bearing. For the purpose of reducing the size of the wave gear drive, it is preferable that the first end plate be formed integrally with the inner race having the rigid internal gear. Where these three members are made integrally, namely as one component part, assembly error of these member can be avoided and the rigidity of the wave gear drive can also be increased, as well as the overall structure of the wave gear drive can be made smaller and more compact.

Although the hollow input rotational shaft is employed in the present example, a solid input shaft may be employed.

According to the wave gear drive 1 of this example, a wave gear mechanism is assembled between the first and second end plates, the cross roller bearing for enabling relative rotation of the first and second end plates comprises the inner race directly fixed to the first end plate, and the rigid internal gear is integrally formed on the inner race. Therefore, the silk hat type wave gear drive can be made small and compact.

Further, the internal teeth formed on the circumferential inner surface of the inner race of the cross roller bearing are positioned approximately at a radially inner side of the raceway of the cross roller bearing. Hence, it can be avoided adverse affects on the cross roller bearing caused by improper deformation of the inner race due to the stress acting on the inner race from the internal teeth.

I claim:

1. A wave gear drive comprising:

first and second end plates positioned in a predetermined gap along an axial direction of the wave gear drive;

a cross roller bearing positioned between the first and second end plates;

a rotational shaft which extends through the first and second end plates and is supported rotatably by these end plates;

a circular rigid internal gear formed integrally on an inner race of the cross roller bearing;

a flexible external gear positioned inside the rigid internal gear; and a wave generator which is fixedly mounted on the rotational shaft and is inserted into the flexible external gear, wherein the inner race of the cross roller bearing is fixedly mounted on the first end plate, and an outer race of the cross roller bearing is fixedly mounted on the second end plate so as to allow relative rotation of the first and second end plates.

2. A wave gear drive according to claim 1, wherein the inner race of the cross roller bearing is formed integrally on the first end plate.

3. A wave gear drive according to claim 1, wherein portion of the rigid internal gear where internal teeth are formed is positioned approximately at a radially inner side of a raceway of the cross roller bearing.

4. A wave gear drive according to claim 1, wherein the rotational shaft is a hollow shaft.

5. A wave gear drive according to claim 1, wherein the wave generator comprises a rigid cam plate formed integrnally on the rotational shaft and a wave bearing fixed between the cam plate and the flexible external gear.

* * * * *